US009267364B2

(12) United States Patent
Poindexter et al.

(10) Patent No.: US 9,267,364 B2
(45) Date of Patent: Feb. 23, 2016

(54) OIL RECOVERY

(75) Inventors: Michael K. Poindexter, Sugar Land, TX (US); Roger L. Kuhlman, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 542 days.

(21) Appl. No.: 13/701,616

(22) PCT Filed: May 27, 2011

(86) PCT No.: PCT/US2011/000969
§ 371 (c)(1),
(2), (4) Date: Dec. 3, 2012

(87) PCT Pub. No.: WO2011/152856
PCT Pub. Date: Dec. 8, 2011

(65) Prior Publication Data
US 2013/0068470 A1    Mar. 21, 2013

Related U.S. Application Data

(60) Provisional application No. 61/351,616, filed on Jun. 4, 2010.

(51) Int. Cl.
*E21B 43/16* (2006.01)
*C09K 8/594* (2006.01)
(52) U.S. Cl.
CPC .............. *E21B 43/164* (2013.01); *C09K 8/594* (2013.01); *Y02P 20/544* (2015.11)
(58) Field of Classification Search
CPC .................................................. E21B 43/164
See application file for complete search history.

(56) References Cited

U.S. PATENT DOCUMENTS

| 3,342,256 A | 9/1967 | Bernard et al. |
| 4,380,266 A | 4/1983 | Wellington |
| 4,572,294 A | 2/1986 | Duerksen |

(Continued)

FOREIGN PATENT DOCUMENTS

| CN | 85108889 | 6/1987 |
| EP | 0212671 | 3/1987 |
| EP | 1258595 | 11/2002 |

OTHER PUBLICATIONS

International Search Report and Written Opinion from related PCT application PCT/US2011/000969 dated Aug. 17, 2011, 13 pages.

(Continued)

*Primary Examiner* — Nicole Coy
(74) *Attorney, Agent, or Firm* — Brooks, Cameron & Huebsch, PLLC

(57) ABSTRACT

Embodiments of the present disclosure include performing one or more oil recovery cycles that recovers oil from an oil containing reservoir. The one or more oil recovery cycles can include providing a flow of supercritical carbon dioxide to the oil containing reservoir, injecting a flow of a surfactant to the flow of supercritical carbon dioxide, where the supercritical carbon dioxide and the surfactant form a mixture, forming an emulsion of the mixture in water within the oil containing reservoir to control mobility of the supercritical carbon dioxide in the oil containing reservoir, reducing the flow of the surfactant to a reduced flow while maintaining the flow of the supercritical carbon dioxide to the oil containing reservoir, and recovering the oil displaced from the oil containing reservoir.

17 Claims, 2 Drawing Sheets

(56) References Cited

U.S. PATENT DOCUMENTS

| | | |
|---|---|---|
| 4,676,316 A | 6/1987 | Mitchell |
| 4,799,547 A | 1/1989 | Borchardt |
| 4,800,957 A | 1/1989 | Stevens et al. |
| 5,033,457 A | 7/1991 | Bonutti |
| 5,033,547 A | 7/1991 | Schievelbein |
| 5,388,644 A | 2/1995 | Romocki |

OTHER PUBLICATIONS

International Preliminary Report on Patentability from related PCT application PCT/US2011/000969 dated Sep. 10, 2012, 29 pages.

Martin, et al. "CO2-Foam Field Test at East Vacuum Grayburg/San Andres Unit", SPE 27786, SPE Reservoir Engineering, Nov. 1995, 266-272.

Stevens, et al. "CO2-Foam Field Verification Pilot Test at EVGSAU: Phase II—Foam Injection Design and Operating Plan", SPE Annual Technical Conference and Exhibition, Oct. 1992, SPE 24642, 115-128.

Smith, et al. "Viscosities of Dispersions of Supercritical CO2 in Surfactant/CO2/H2O/NaCL Systems", Journal of Dispersion Science and Technology, 9:1, 1988, 33-59.

Harpole, et al. "CO2 Foam Field Verification Pilot Test at EVSAU: Phase IIIC—Reservoir Characterization and Response to Foam Injection" SPE 27798, Society of Petroleum Engineers, Inc, 1994, 163-176.

Patzek, et al. "Field Applications of Steam Foam for Mobility Improvement and Profile Control", SPE Reservoir Engineering, May 1996, 79-85.

Bernard, et al. "Effect on Foam on Permeability of Porous Media to Gas", SPE 983, Society of Petroleum Engineers Journal, Sep. 1964, 267-274.

Wellington, et al. "CT Studies of Surfactant-Induced CO2 Mobility Control", SPE 14393, Society of Petroleum Engineers, 1985, 12 pages.

Yang, et al. "Mobility Control Using CO2 Forms", SPE 19689, Society of Petroleum Engineers, Inc., 1989, 603-618.

Kuhlman, et al. "CO2 Foam with Surfactants Used Below Their Critical Micelle Concentration", SPE Reservoir Engineering, 1992, 445-452.

Lee, et al. "Change in Apparent Viscosity of CO2 Foam with Rock Permeability", SPE Reservoir Engineering, 1991, 421-428.

Tsau, et al. "CO2 Foam Field Verification Test at EVGSAU: Phase IIIA—Surfactant Performance Characterization and Quality Assurance" SPE 27785, Society of Petroleum Engineers, Inc., 1994, 23-32.

OIL RECOVERY

This application is a National Stage application under 35 U.S.C. 371 of PCT/US2011/000969, filed on May 27, 2011 and published as WO 2011/152856 A1 on Dec. 8, 2011, which claims the benefit of U.S. Provisional Application Ser. No. 61/351,616 filed Jun. 4, 2010, the entire contents of which are incorporated herein by reference in its entirety.

FIELD OF DISCLOSURE

Embodiments of the present disclosure are directed toward oil recovery; more specifically, embodiments are directed toward processes for oil recovery.

BACKGROUND

Recovering oil from an oil containing reservoir can include three distinct phases. During a first phase, natural pressure of the oil containing reservoir and/or gravity can drive oil into a wellbore, and combined with an artificial lift technique, such as pumping, bring the oil to the surface. However for some oil containing reservoirs, in the first phase only about 10 percent of the original oil in place is recovered.

A second phase, to extend the productive life of the oil containing reservoir, can increase oil recovery to 20 to 40 percent of the original oil in place. For some applications, the second phase can include injecting water to displace oil and drive it to a production wellbore. In some applications, reinjection of natural gas has been employed to maintain and/or increase reservoir pressure, as natural gas is often produced simultaneously with the oil recovery.

However, with much of the easy-to-recover oil already recovered via the first phase and/or the second phase, a third distinct phase of oil recovery has been developed. The third phase may be referred to as enhanced oil recovery. Enhanced oil recovery techniques offer prospects for producing more of the oil containing reservoir's original oil in place, thus further extending the productive life the oil containing reservoir. Worldwide, one estimate of oil in place that is not recoverable by the first phase of oil recovery or the second phase of oil recovery that could be the targeted by enhanced oil recovery techniques is 377 billion barrels of oil. Enhanced oil recovery can include an injection of fluids other than water, such as steam, gas, alkali, surfactant solutions, various polymers or carbon dioxide ($CO_2$).

For some applications the fluid is miscible with the hydrocarbons in the oil containing reservoir. This fluid injection can help reduce the viscosity of oil present in the oil containing reservoir in order to increase the flow of oil to the production wellbore.

Miscible carbon dioxide injection, however, can be accompanied with a number of drawbacks. One problem encountered is poor sweep of the oil containing reservoir. Poor sweep can occur when carbon dioxide injected into the oil containing reservoir flows through the paths of least resistance (i.e. more permeable zones) due to the low viscosity of the carbon dioxide, thus bypassing significant portions of the oil containing reservoir and the oil located there. In addition, due to the low density of the carbon dioxide, the injected carbon dioxide can rise to the top of the formation and "override" portions of the formation, leading to early breakthrough of the carbon dioxide at the production wellbore, leaving less carbon dioxide within the oil containing reservoir to contact with the oil.

To increase the enhanced oil recovery process effectiveness, a surfactant has been used to generate an emulsion in the formation. An emulsion can generate an apparent viscosity of about 100 to about 1,000 times that of the injected carbon dioxide, therefore, the emulsion can inhibit or slow the flow of the carbon dioxide into the path of least resistance. In other words, the emulsion can serve to block the volumes of the oil containing reservoir through which the carbon dioxide can short-cut, thereby reducing its tendency to channel through highly permeable fissures, cracks, or strata, and direct the carbon dioxide toward previously unswept portions of the oil containing reservoir. As such, the emulsion can help force the carbon dioxide to the recoverable hydrocarbons in the less depleted portions of the oil containing reservoir.

SUMMARY

One or more embodiments of the present disclosure provide a process for oil recovery and include performing one or more oil recovery cycles that recovers oil from an oil containing reservoir. The one or more oil recovery cycles can include providing a flow of supercritical carbon dioxide to the oil containing reservoir, injecting a flow of a surfactant to the flow of supercritical carbon dioxide, where the supercritical carbon dioxide and the surfactant form a mixture, forming an emulsion of the mixture in water within the oil containing reservoir to control mobility of the supercritical carbon dioxide in the oil containing reservoir, reducing the flow of the surfactant to a reduced flow while maintaining the flow of the supercritical carbon dioxide to the oil containing reservoir such that a bottom-hole pressure remains above a predetermined value, and recovering the oil displaced from the oil containing reservoir.

One or more embodiments of the present disclosure include performing one or more oil recovery cycles that recovers oil from an oil containing reservoir. The one or more oil recovery cycles can include providing a flow of supercritical carbon dioxide to the oil containing reservoir, injecting a flow of a surfactant to the flow of supercritical carbon dioxide, where the supercritical carbon dioxide and the surfactant form a mixture, forming an emulsion of the mixture in water within the oil containing reservoir to control mobility of the supercritical carbon dioxide in the oil containing reservoir, reducing the flow of the surfactant to a reduced flow while maintaining the flow of the supercritical carbon dioxide to the oil containing reservoir such that a flow rate of the supercritical carbon dioxide remains below a predetermined value, and recovering the oil displaced from the oil containing reservoir.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION

Figure 1:
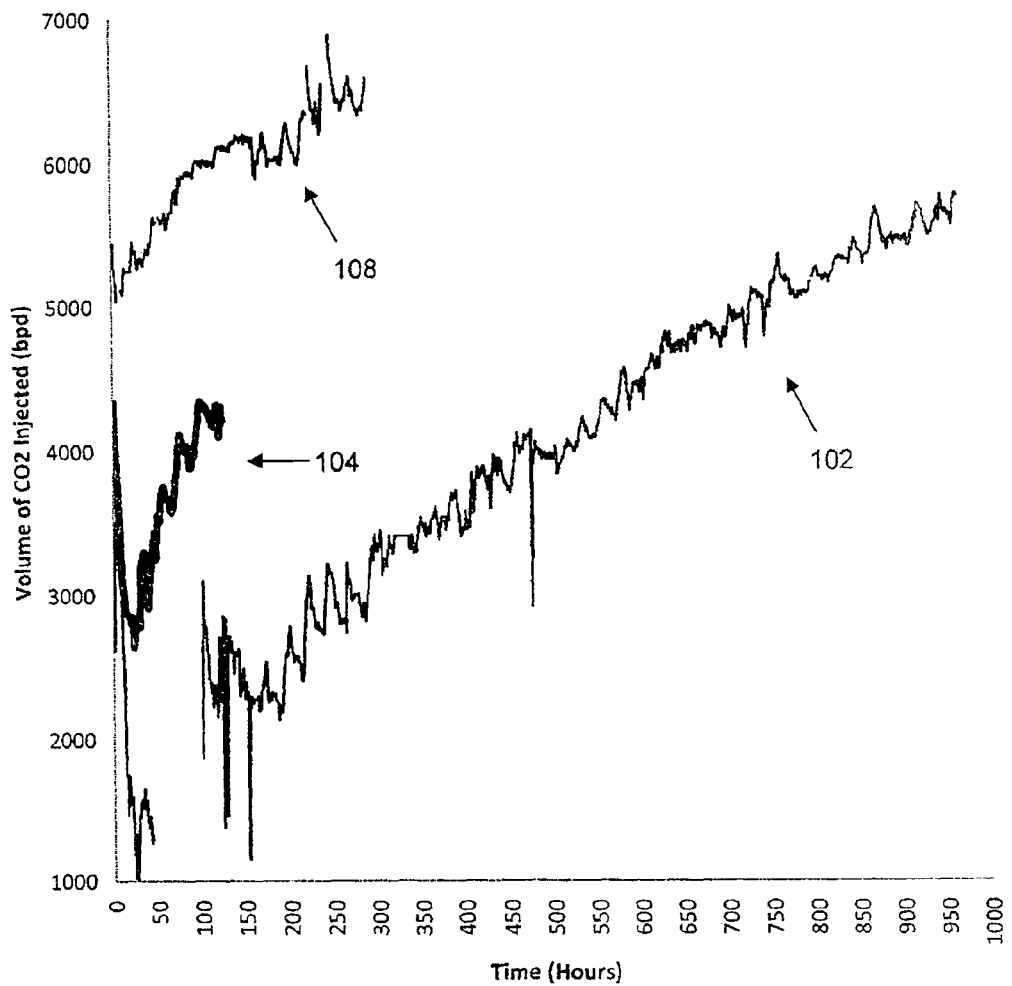
FIG. 1 is a graphical illustration that illustrates volume of supercritical carbon dioxide injected versus time.

The present disclosure provides processes for oil recovery, e.g., enhanced oil recovery. One or more embodiments include performing one or more oil recovery cycles that recovers oil from an oil containing reservoir. One or more of the oil recovery cycles include providing a flow of supercritical carbon dioxide to an oil containing reservoir, injecting a flow of a surfactant to the flow of supercritical carbon dioxide, where the supercritical carbon dioxide and the surfactant form a mixture, forming an emulsion of the mixture in water within the oil containing reservoir to control mobility of the supercritical carbon dioxide in the oil containing reservoir, reducing the flow of the surfactant to a reduced flow while maintaining the flow of the supercritical carbon dioxide to the oil containing reservoir such that a bottom-hole pressure remains above a predetermined value, and recovering the oil displaced from the oil containing reservoir.

Surprisingly, it has been found that reducing the flow of the surfactant to a reduced flow while maintaining the flow of the supercritical carbon dioxide does not cause deviation to a stable emulsion front of carbon dioxide and surfactant in water within the oil containing reservoir. In other words, it was surprisingly found that reducing the flow of the surfactant does not cause the stable emulsion front to collapse and/or become insufficient in controlling carbon dioxide mobility. Reducing the flow of the surfactant, as disclosed herein, may be advantageous in that a reduced amount of surfactant may be used for some oil recovery applications.

The figures herein follow a numbering convention in which the first digit or digits correspond to the drawing figure number and the remaining digits identify an element in the drawing. Similar elements between different figures may be identified by the use of similar digits. For example, 102 may reference element "104" in FIG. 1, and a similar element may be referenced as 204 in FIG. 2.

One or more embodiments include providing a flow of supercritical carbon dioxide to an oil containing reservoir. Embodiments are directed to oil recovery, e.g. recovering oil from the oil containing reservoir. Different oil containing reservoirs may have various temperatures; however, generally the oil containing reservoir temperature can be in a range of 30 degrees Celsius (° C.) to 95 degrees ° C.

As used herein, the term "oil" refers to a naturally occurring liquid consisting of a complex mixture of hydrocarbons of various molecular weights and structures, and other organic compounds, which are found in geological formations beneath the earth's surface, referred to herein as an oil containing reservoir. "Oil" is also known, and may be referred to, as petroleum and/or crude oil.

Carbon dioxide ($CO_2$) can exist in four distinct phases depending upon its temperature and pressure. The four phases are as a solid, a liquid, a vapor (or gas), and a supercritical fluid. A supercritical fluid is a defined state of a compound, mixture or element above its critical pressure and critical temperature. The supercritical fluid may behave as a liquid with respect to density, while behaving like a vapor with respect to viscosity. Carbon dioxide as a supercritical fluid is stable above a critical pressure of 6.9 megapascal (MPa) and a critical temperature of 31° C. For one or more embodiments of the present disclosure the carbon dioxide can be in a fluid state either as a liquid and/or as a supercritical fluid and will be referred to herein as "supercritical carbon dioxide."

The flow of supercritical carbon dioxide may be provided to the oil containing reservoir via an injection well, e.g., a wellbore. The oil containing reservoir may include a plurality of injection wells. For one or more embodiments, the flow of supercritical carbon dioxide to the oil containing reservoir can be at a pressure of from 800 pound-force per square inch to 3000 pound-force per square inch. For some applications, the flow of supercritical carbon dioxide may be provided to the oil containing reservoir at a pressure that can be greater than a miscibility pressure of a particular oil containing reservoir. Miscibility pressure refers to the minimum pressure at which the supercritical carbon dioxide and the oil in the oil containing reservoir are miscible. The miscibility pressure may vary due, at least in part, to the chemical makeup of the oil in the oil containing reservoir and/or the oil containing reservoir temperature.

One or more embodiments include injecting a flow of a surfactant to the flow of supercritical carbon dioxide, where the supercritical carbon dioxide and the surfactant form a mixture. For one or more embodiments, the mixture may have a surfactant concentration of 10 parts per million to 10,000 parts per million, or preferably 100 parts per million to 5,000 parts per million.

As used herein, a surfactant, or surface active agent, is a substance which lowers the surface tension of a medium in which it is dissolved, lowers the interfacial tension of immiscible phases, and/or stabilizes an emulsion. Surfactants can include a polar (hydrophilic) moiety, and a nonpolar (hydrophobic) moiety; surfactants are sometimes called an amphiphile because of this dual nature. For the disclosed embodiments the surfactant is soluble in the supercritical carbon dioxide at one or more concentrations. Surfactant suppliers, such as The Dow Chemical Company, Sasol, and Harcros Chemical, for example, may provide suitable surfactants.

Surfactants can be divided into four groups based upon their polar moieties: nonionic surfactants, cationic surfactants, anionic surfactants and amphoteric surfactants, which may be referred to as zwitterionic surfactants. For one or more embodiments, the surfactant is selected from the group consisting of nonionic surfactants, cationic surfactants, anionic surfactants, amphoteric surfactants, and combinations thereof.

Nonionic surfactants in their natural state do not form ionic bonds. However, nonionic surfactants can form ionic bonds if they are, for example, deprotonated or protonated. When dissolved in solution, nonionic surfactants do exhibit surfactant properties. Nonionic surfactants can be prepared by a procedure that includes adding ethylene oxide to long-chain hydrocarbons with terminal polar groups, e.g., —OH, —COOH, amines, amides, etc. The procedure introduces ethoxy groups, which are polar in nature and form hydrogen bonds with water. Examples of nonionic surfactants include, but are not limited to, ethoxylated aliphatic alcohols, polyoxyethylene, carboxylic esters, polyethylene glycol esters, anhydrosorbitol ester and exthoxylated derivatives, glycol esters of fatty acids, carboxylic amides, monoalkanolamine condensates, alkoxylates based on ammonia, primary amines or secondary amines, polyoxyethylene fatty acid amides, branched alkylphenol alkoxylates, linear alkylphenol alkoxylates, and branched alkyl alkoxylates. In addition to ethylene oxide, other oxiranes (e.g. propylene oxide, butylene oxide, etc.) can also be employed with or without ethylene oxide and in combinations with each other.

Cationic surfactants may be characterized by the polar moiety being positively charged. Cationic surfactants may include an inorganic anion to balance the charge. Examples of cationic surfactants include, but are not limited to, quaternary ammonium salts, cetyl trimethylammonium bromide, cetylpyridinium chloride, polyethoxylated tallow amine, benzalkonium chloride, benzethonium chloride, amines with amide linkages, polyoxyethylene alkyl amines, alicyclic amines, and 2-alkyl-hydroxethyl 2-imidazolines.

Anionic surfactants may be characterized by the polar moiety being negatively charged. The negative charge may be balanced with a cation, e.g. sodium, associated with the anionic surfactant. Anionic surfactants include, but are not limited to, sulfates, sulfonates, ethoxylated sulfates, propoxylated sulfates, ethoxylated sulfonates, propoxylated sulfonates, and phosphates.

Amphoteric surfactants may be negatively charged, positively charged or nonionic in solution, depending on the acidity and/or pH of the solution. Amphoteric surfactants may contain two charged groups of different sign. For example, a positive charge may be associated with ammonium, and a negative charge may be associated with carboxylate, sulphate, or sulphonate. Examples of amphoteric surfactants include, but are not limited to, betaines, hydroxysultaines, amine oxides and imidazole-based carboxylates.

One or more embodiments include forming an emulsion of the mixture, of the supercritical carbon dioxide and the surfactant, in water within the oil containing reservoir to control mobility of the supercritical carbon dioxide in the oil containing reservoir. As used herein, the term "emulsion" refers to a system in which liquid and/or droplets of a supercritical fluid are dispersed in a liquid. It is understood that in certain embodiments of the present disclosure that the carbon dioxide can exist as a gas, liquid, or supercritical fluid depending on the temperature and pressure. As used herein an "emulsion" may include a "foam," which refers to a dispersion in which a gas is dispersed in a liquid. As used herein, foam and emulsion can be used interchangeably.

The carbon dioxide, which is much less viscous than oil or water, may move faster in some regions and directions than others to create viscous fingers through which a significant portion of the injected fluids may flow. Some of these fingers may arrive prematurely at a production well; lowering the effectiveness of both the injected carbon dioxide and of the production well's pumping capacity. Additionally, gravity separation of the water and carbon dioxide can result in gravity override, where the more dense water flows or resides in a lower zone of the oil containing reservoir and the less dense carbon dioxide flows or resides in an upper zone of the oil containing reservoir. The emulsion helps reduce viscous fingering and/or gravity override that may result, at least in part, due to the relative lower viscosity and density of the carbon dioxide. Moreover, since fluids flow preferentially into areas of high permeability in the oil containing reservoir, the emulsion may greatly increase local resistance to flow in the more permeable regions, thereby diverting injected fluids to areas of lower permeability and improving sweep efficiency for the oil recovery throughout a greater portion of the oil containing reservoir.

In one or more embodiments, the emulsion may be formed from shear flow. For example, the emulsion may be formed from shear flow occurring within the oil containing reservoir. The emulsion can have a degree of stability for the oil recovery over varying conditions associated with the oil containing reservoir, including, but not limited to, temperature, pressure, and chemical conditions in the oil containing reservoir. The emulsion can propagate throughout the oil containing reservoir, for example via an emulsion front.

In some embodiments, the addition of surfactant to supercritical carbon dioxide will be applied to an oil containing reservoir, where previously supercritical carbon dioxide without surfactant was added to the oil containing reservoir in an alternating sequence involving water injection (a process sometimes known as a WAG, water alternating gas, cycle). Due to the fingering or channeling for carbon dioxide, discussed herein, regions with high permeability would likely have been swept more thoroughly or preferentially during the prior surfactant-free carbon dioxide process. Regions with low permeability would thus still contain more recoverable oil due to the less efficient prior application of carbon dioxide. In essence, the addition of surfactant will continue the recovery process into zones which were poorly swept by the application of carbon dioxide (surfactant-free)/water cycles alone.

One or more embodiments include reducing the flow of the surfactant to a reduced flow while maintaining the flow of the supercritical carbon dioxide to the oil containing reservoir such that a bottom-hole pressure remains above a predetermined value. As discussed herein, surprisingly, it has been found that reducing the flow of the surfactant to a reduced flow while maintaining the flow of the supercritical carbon dioxide does not cause deviation to a stable emulsion front of carbon dioxide and surfactant in water within the oil containing reservoir. The reduced flow can have a value that is zero (0) weight percent of the original flow of the surfactant or greater. For example, the reduced flow can have a value that is zero (0) weight percent, ten (10) weight percent, or twenty (20) weight percent of the original flow of the surfactant. The reduced flow can have a value that is fifty (50) weight percent of the original flow of the surfactant or less. For example, the reduced flow can have a value that is fifty (50) weight percent, forty weight percent, or thirty (30) weight percent of the original flow of the surfactant. For one or more embodiments, the reduced flow has a value that is zero (0) weight percent to fifty (50) weight percent of the original flow of the surfactant.

In one or more embodiments, reducing the flow of the surfactant to the reduced flow may occur in a variety of ways. For example, reducing the flow of the surfactant into the supercritical carbon dioxide may occur linearly over a predetermined time interval and/or non-linearly over a predetermined time interval. A linear reduction may occur over a predetermined time interval and may include reducing, i.e. decreasing, the flow of the surfactant at a constant rate from the flow of the surfactant to the reduced flow of the surfactant, e.g. the flow of the surfactant may be ramped down to the reduced flow of the surfactant. A non-linear reduction may occur over a predetermined time interval and may include reducing the flow of the surfactant at a non-constant rate from the flow of the surfactant to the reduced flow of the surfactant. For example, the flow of the surfactant may be stepped down to the reduced flow of the surfactant. Stepping down the flow of the surfactant may include steps, i.e. decreases in the flow of the surfactant, of the same magnitude and/or steps having different magnitudes. Additionally, reducing the flow of the surfactant at a non-constant rate may include reducing the flow of the surfactant by an exponential rate of decay and/or another mathematical function. Reducing the flow of the surfactant to the reduced flow of the surfactant may have a portion of the reduction that is linear and a portion of the reduction that is non-linear. For example, the flow of the surfactant may be reduced as is described by a decreasing portion of a wave function, where the decreasing portion of the wave function includes a portion of linear decrease and a portion of non-linear decrease.

As described above, the flow of the surfactant may be reduced gradually. However, the flow of the surfactant may also be reduced immediately. For example, an injection valve, through which the flow of the surfactant passes, may be repositioned from an open state to a closed state, effectively stopping the flow of the surfactant to the flow of supercritical carbon dioxide, where such a reduction may be considered an immediate reduction.

Figure 2:
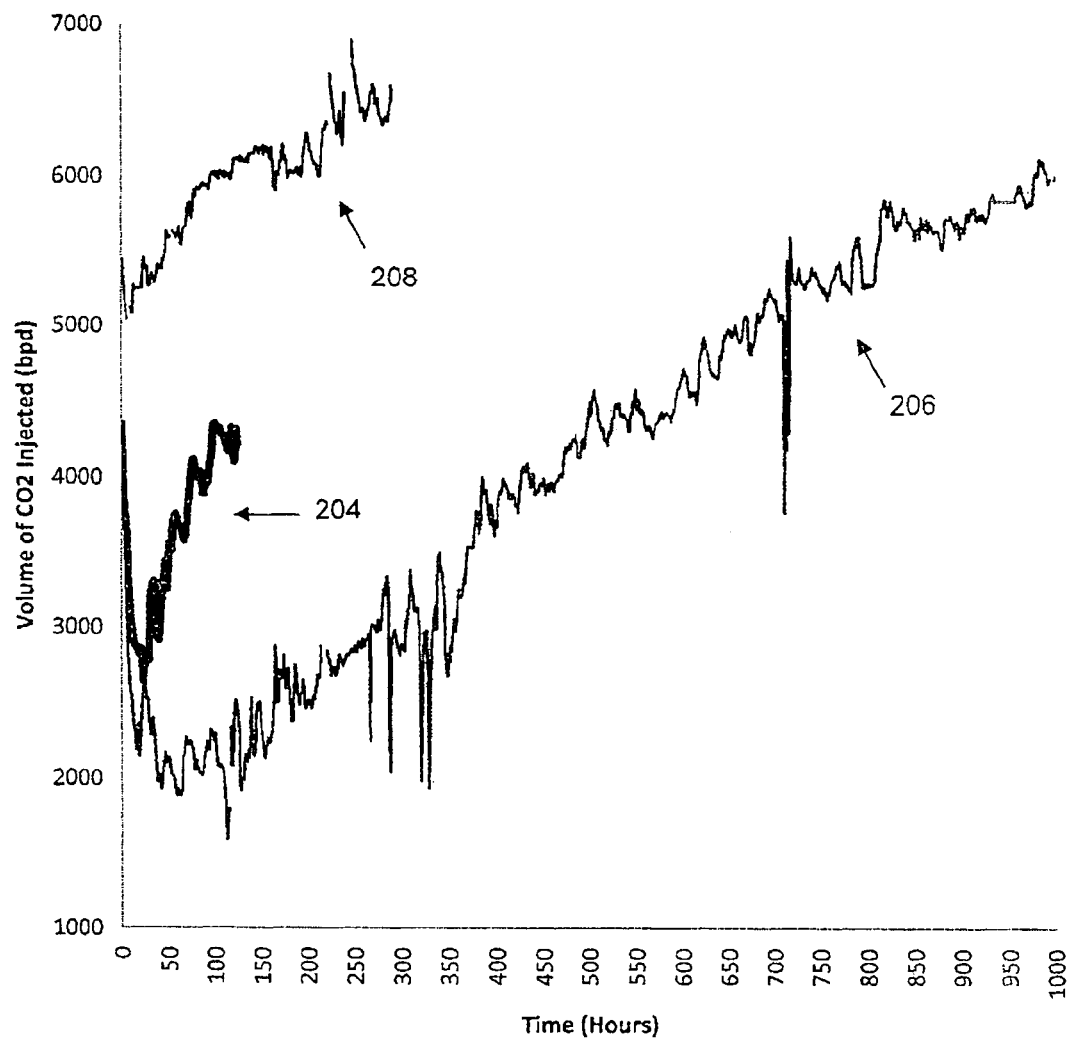
FIG. 2 is a graphical illustration that illustrates volume of supercritical carbon dioxide injected versus time.

FIG. 1 illustrates field data generated during an oil recovery process. FIG. 1 illustrates a flow of supercritical carbon dioxide to an oil containing reservoir that is represented by a volume of supercritical carbon dioxide injected into the oil containing reservoir in barrels per day (bpd), where a barrel is approximately 160 liters. Data set 102 includes a portion, from zero hours to 502 hours, where a surfactant (Surfactant 08-1015, The Dow Chemical Company), was injected into a flow of supercritical carbon dioxide to the oil containing reservoir. The surfactant concentration was 1,200 parts per million (a relative proportion of one part per million parts examined), based upon the supercritical carbon dioxide. Data set 102 illustrates a volume of supercritical carbon dioxide injection that precedes a minimum value for the volume of supercritical carbon dioxide injection. For FIG. 1, data was not collected for a time interval from 43 hours to 100 hours. However, that portion of FIG. 1 is believed to be similarly shaped to an analogous portion of data set 206, as illustrated in FIG. 2. The minimum value for the volume of supercritical carbon dioxide injection, corresponding to a time of approximately 50 hours, is thought to be due, at least in part, to a residual effect of surfactant that was injected in a preceding oil recovery cycle. However, a minimum value of the volume of supercritical carbon dioxide injection may occur with an initial surfactant injection.

Following the minimum value for the volume of supercritical carbon dioxide injection for data set 102, FIG. 1 illustrates that the volume of supercritical carbon dioxide injection increases in a linear fashion. Data set 102 includes a portion, from 502 hours to 1,000 hours, where no surfactant was injected to the flow of supercritical carbon dioxide. This result is surprising because the volume of supercritical carbon dioxide injected is unaffected by the reduction of surfactant, as is shown by the constant rate of increase of the volume of supercritical carbon dioxide injected before the flow of surfactant was stopped and after the flow of surfactant was stopped.

Data set 104 illustrates another oil recovery cycle from the same oil recovery process as data set 102, i.e., same injection well and process conditions, where no surfactant was injected for the first 46 hours of that oil recovery cycle (no surfactant was injected from zero hours to 46 hours). Like data set 102, data set 104 shows a minimum value for the volume of supercritical carbon dioxide injection, corresponding to a time of approximately 50 hours that is thought to be due, at least in part, to a residual effect of surfactant that was injected in a preceding oil recovery cycle. However, unlike data set 102, in data set 104, the volume of supercritical carbon dioxide injection increases at a much greater rate, even after the nonionic surfactant was injected, with a surfactant concentration of 1,200 parts per million, based upon the supercritical carbon dioxide, starting at hour 46. Data set 104 is indicative of an oil recovery cycle that entirely lacks surfactant injection at the start of the supercritical carbon dioxide cycle, while in contrast to data set 104, data set 102 is indicative of an oil recovery cycle that includes surfactant injection throughout, even though the surfactant injection associated with data set 102 was stopped at 502 hours.

Data set 108 illustrates a volume of supercritical carbon dioxide injection from the same oil recovery process as data set 102, i.e., same injection well and process conditions, for a time period that precedes any surfactant injection to the oil containing reservoir. Data set 108 shows that a greater volume of supercritical carbon dioxide injection is employed when no surfactant has been injected during a preceding oil recovery cycle.

FIG. 2 illustrates field data generated during another oil recovery cycle from the oil recovery process, discussed herein, i.e., same injection well and process conditions. Data set 206 has properties similar to data set 102, including a relatively high volume of supercritical carbon dioxide injection that precedes a minimum value for the volume of supercritical carbon dioxide injection, corresponding to a time of approximately 50 hours and a following linear increase of the volume of supercritical carbon dioxide injected after the flow of surfactant was stopped. However, for data set 206 the flow of surfactant was stopped at 304 hours. Data set 206 again shows that the volume of supercritical carbon dioxide injected is unaffected by the reduction of surfactant, because the rate of increase of the volume of supercritical carbon dioxide injected after the flow of surfactant was stopped is equal to the rate of increase of the volume of supercritical carbon dioxide injected prior to stopping the flow of surfactant. Again, data set 204, discussed herein, is indicative of an oil recovery cycle that entirely lacks surfactant injection, while in contrast to data set 204, data set 206 is indicative of an oil recovery cycle that includes surfactant injection throughout the first part of the supercritical carbon dioxide injection, even though the surfactant injection associated with data set 206 was stopped at 304 hours.

Data set 208 again shows that a greater volume of supercritical carbon dioxide injection is employed when no surfactant has been injected during a preceding oil recovery cycle.

The pressure utilized to inject the supercritical carbon dioxide at a given rate can be a function of oil containing reservoir parameters that include, but are not limited to, permeability, zone thickness, and a bottom-hole pressure exerted by a column of the carbon dioxide in the wellbore. For one or more embodiments the flow of supercritical carbon dioxide to the oil containing reservoir is at a pressure of 1,400 pounds per square inch or greater. The flow of supercritical carbon dioxide may include other components, for example, but not limited to, nitrogen and methane. However, the flow of supercritical carbon dioxide can be ≥90% carbon dioxide by volume.

As discussed herein, one or more embodiments may include maintaining the flow of the supercritical carbon dioxide to the oil containing reservoir such that a bottom-hole pressure remains above a predetermined value. Also as discussed herein, the emulsion front can propagate throughout the oil containing reservoir. As the emulsion front propagates the emulsion may fail. For example, the emulsion may collapse and/or become insufficient in controlling carbon dioxide mobility in another manner. An emulsion failure may allow fluids within the oil containing reservoir to flow to areas of high permeability within the oil containing reservoir. The fluid flow to the areas of high permeability within the oil containing reservoir may correspond to a decrease in a bottom-hole pressure of the oil containing reservoir. Bottom-hole pressure may be defined as the pressure in the wellbore at the level corresponding to where the fluid in the wellbore penetrates the oil containing reservoir. This pressure can be calculated given the specifics of the fluid/gas being injected and the injection conditions or as is more common can be measured directly using a pressure gauge inserted in the wellbore to the desired depth.

One or more embodiments may include maintaining the flow of the supercritical carbon dioxide to the oil containing reservoir such that a flow rate of the supercritical carbon dioxide remains below a predetermined value. As discussed herein the emulsion may collapse and/or become insufficient in controlling carbon dioxide mobility in another manner. This collapse or insufficiency can lead to an increase in the flow of carbon dioxide via channeling. For example, the collapse or insufficiency may provide an increase in the slope of an injection rate of the supercritical carbon dioxide versus time. For various oil recovery applications, the flow of the supercritical carbon dioxide can have different values. Therefore the predetermined value that the flow rate of the supercritical carbon dioxide to the oil containing reservoir shall remain below will have different values from application to application. The predetermined value of the flow rate may be a mass flow rate, a volumetric flow rate, or a molar flow rate.

One or more embodiments may include stopping the flow of the supercritical carbon dioxide, stopping the reduced flow of the surfactant, and hydrating the oil containing reservoir with a water injection. As discussed herein, the flow of the supercritical carbon dioxide to the oil containing reservoir may be maintained such that a bottom-hole pressure remains above a predetermined value or such that a flow rate of the supercritical carbon dioxide remains below a predetermined value. When either the bottom-hole pressure reaches or is below the predetermined value, and/or the flow rate of the supercritical carbon dioxide goes above a predetermined value the flow of supercritical carbon dioxide may be stopped. Also, when either the bottom-hole pressure reaches or is below the predetermined value, and/or the flow rate of the supercritical carbon dioxide goes above a predetermined value the reduced flow of the surfactant, if any, may be stopped. Stopping the flow of the supercritical carbon dioxide and stopping the reduced flow of the surfactant, if any, are done prior to hydrating the oil containing reservoir with a water injection.

The water injection may be provided via a water supply header. The water supply header may operate at a pressure that is the same, greater than, or less than the supercritical carbon dioxide supply header pressure, depending upon the application. Adding the water hydrates the oil containing reservoir. The water pressure may be reduced once the supercritical carbon dioxide is displaced from the wellbore. For one or more embodiments, a ratio of pore volumes of supercritical carbon dioxide injected to the oil containing reservoir to pore volumes of water injected to the oil containing reservoir is at least 1:1, preferentially 3:1 and most preferentially 6:1 or greater. Hydrating the oil containing reservoir may help provide that the oil containing reservoir is at an appropriate production pressure, which can vary amongst different oil containing reservoirs.

Following the water injection, a subsequent oil recovery cycle may be commenced. The subsequent oil recovery cycle may include the steps of a preceding oil recovery cycle. A preceding oil recovery cycle and/or a subsequent oil recovery cycle may include an emulsion stabilizer. Various suitable emulsion stabilizers and the processes for their use with enhanced oil recovery may be utilized.

Like a preceding oil recovery cycle, the subsequent oil recovery cycle may include providing a flow of supercritical carbon dioxide to the oil containing reservoir and injecting a flow of a surfactant to the flow of supercritical carbon dioxide, where the supercritical carbon dioxide and the surfactant form a mixture. The flow of the surfactant of the subsequent oil recovery cycle may have a value that is different than the flow of the surfactant of a preceding oil recovery cycle or the flow of the surfactant of the subsequent oil recovery cycle may have a value that is the same as the flow of the surfactant of a preceding oil recovery cycle.

For one or more embodiments, the value of the flow of the surfactant of the subsequent oil recovery cycle can be (e.g., is) less than the flow of the surfactant of the preceding oil recovery cycle. For example, the lesser value may provide that a subsequent oil recovery cycle mixture of the supercritical carbon dioxide and the surfactant has a lower surfactant concentration than a preceding oil recovery cycle mixture of the supercritical carbon dioxide and the surfactant, where the preceding oil recovery cycle mixture has a surfactant concentration of 100 parts per million to 5,000 parts per million.

For one or more embodiments, the value of the flow of the surfactant of the subsequent oil recovery cycle can be (e.g., is) greater than the flow of the surfactant of the preceding oil recovery cycle. For example, the greater value may provide that a subsequent oil recovery cycle mixture of the supercritical carbon dioxide and the surfactant has a higher surfactant concentration than a preceding oil recovery cycle mixture of the supercritical carbon dioxide and the surfactant, where the preceding oil recovery cycle mixture has a surfactant concentration of 100 parts per million to 5,000 parts per million.

One or more embodiments include recovering the oil displaced from the oil containing reservoir. Supercritical carbon dioxide containing surfactant that is provided to the oil containing reservoir may mix with oil or act as an emulsion front pushing through the reservoir and remerge from the oil containing reservoir with the oil via a production well. For example, supercritical carbon dioxide that is provided to the oil containing reservoir above its minimum miscibility pressure, can act as a solvent. The carbon dioxide-surfactant mixture can in effect mobilize hydrocarbon components, i.e. oil, to reduce the oil's viscosity so that it flows more easily to the production well for recovery and/or it can effectively sweep through the less permeable regions as an emulsion front.

What is claimed is:

1. A process for oil recovery, comprising:
   performing oil recovery cycles that recover oil from an oil containing reservoir, where each of the oil recovery cycles includes;
   providing a flow of supercritical carbon dioxide to the oil containing reservoir;
   injecting a flow of a surfactant to the flow of supercritical carbon dioxide, where the supercritical carbon dioxide and the surfactant form a mixture having a surfactant concentration of 10 parts per million to 10,000 parts per million;
   forming an emulsion of the mixture in water within the oil containing reservoir to control mobility of the supercritical carbon dioxide in the oil containing reservoir;
   reducing the flow of the surfactant to a reduced flow while maintaining the flow of the supercritical carbon dioxide to the oil containing reservoir such that a bottom-hole pressure remains above a predetermined value, where the reduced flow has a value that is 10 weight percent of the flow of the surfactant; and
   recovering the oil displaced from the oil containing reservoir.

2. The process of claim 1, where the surfactant is soluble in the supercritical carbon dioxide and is selected from the group consisting of nonionic surfactants, cationic surfactants, anionic surfactants, amphoteric surfactants, and combinations thereof.

3. The process of claim 1, where the mixture has a surfactant concentration of 100 parts per million to 5,000 parts per million.

4. The process of claim 1, where reducing the flow of the surfactant occurs linearly over a predetermined time interval.

5. The process of claim 1, where reducing the flow of the surfactant occurs non-linearly over a predetermined time interval.

6. The process of claim 1, where flow of supercritical carbon dioxide to the oil containing reservoir is at a pressure of 1,400 pounds per square inch or greater.

7. The process of claim 1, where the oil recovery cycles further include;

stopping the flow of the supercritical carbon dioxide;
stopping the reduced flow of the surfactant; and
hydrating the oil containing reservoir with a water injection.

8. The process of claim 7, where the flow of the surfactant of a subsequent oil recovery cycle has a value that is different than the flow of the surfactant of a preceding oil recovery cycle.

9. The process of claim 8, where the value of the flow of the surfactant of the subsequent oil recovery cycle is less than the flow of the surfactant of the preceding oil recovery cycle.

10. The process of claim 8, where the value of the flow of the surfactant of the subsequent oil recovery cycle is greater than the flow of the surfactant of the preceding oil recovery cycle.

11. The process of claim 7, where a ratio of pore volumes of supercritical carbon dioxide injected to the oil containing reservoir to pore volumes of water injected to the oil containing reservoir is at least 1:1.

12. A process for oil recovery, comprising:
performing oil recovery cycles that recover oil from an oil containing reservoir, where each of the oil recovery cycles includes;
providing a flow of supercritical carbon dioxide to the oil containing reservoir;
injecting a flow of a surfactant to the flow of supercritical carbon dioxide, where the supercritical carbon dioxide and the surfactant form a mixture having a surfactant concentration of 10 parts per million to 10,000 parts per million;
forming an emulsion of the mixture in water within the oil containing reservoir to control mobility of the supercritical carbon dioxide in the oil containing reservoir;
reducing the flow of the surfactant to a reduced flow while maintaining the flow of the supercritical carbon dioxide to the oil containing reservoir such that a flow rate of the supercritical carbon dioxide remains below a predetermined value, where the reduced flow has a value that is 10 weight percent of the flow of the surfactant; and
recovering the oil displaced from the oil containing reservoir.

13. The process of claim 12, where the surfactant is soluble in the supercritical carbon dioxide and is selected from the group consisting of nonionic surfactants, cationic surfactants, anionic surfactants, amphoteric surfactants, and combinations thereof.

14. The process of claim 12, where the mixture has a surfactant concentration of 100 parts per million to 5,000 parts per million.

15. The process of claim 12, where the oil recovery cycles further include;
stopping the flow of the supercritical carbon dioxide;
stopping the reduced flow of the surfactant; and
hydrating the oil containing reservoir with a water injection.

16. The process of claim 15, where the flow of the surfactant of a subsequent oil recovery cycle has a value that is different than the flow of the surfactant of a preceding oil recovery cycle.

17. The process of claim 15, where a ratio of pore volumes of supercritical carbon dioxide to water is at least 1:1.

* * * * *